(12) United States Patent
Yoshino et al.

(10) Patent No.: US 11,565,427 B2
(45) Date of Patent: Jan. 31, 2023

(54) ROBOT SYSTEM

(71) Applicant: FANUC CORPORATION, Yamanashi (JP)

(72) Inventors: Kiyoshi Yoshino, Yamanashi (JP); Makoto Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/993,492

(22) Filed: Aug. 14, 2020

(65) Prior Publication Data

US 2020/0368918 A1 Nov. 26, 2020

Related U.S. Application Data

(62) Division of application No. 16/057,105, filed on Aug. 7, 2018, now Pat. No. 10,786,906.

(30) Foreign Application Priority Data

Aug. 25, 2017 (JP) .............................. JP2017-162670

(51) Int. Cl.
*B25J 9/16* (2006.01)
*B25J 13/06* (2006.01)
(Continued)

(52) U.S. Cl.
CPC ............. *B25J 13/06* (2013.01); *B25J 9/1664* (2013.01); *B25J 9/1689* (2013.01); *B25J 9/1697* (2013.01);
(Continued)

(58) Field of Classification Search
CPC . B25J 13/06; B25J 13/00; B25J 19/023; B25J 9/1697; B25J 9/1664; B25J 9/1689;
(Continued)

(56) References Cited

U.S. PATENT DOCUMENTS 5,319,443 A * 6/1994 Watanabe .............. B25J 9/1692
356/614
5,742,263 A * 4/1998 Wang .................... G02B 27/017
345/7

(Continued)

FOREIGN PATENT DOCUMENTS

CN 1957374 5/2007
CN 101493682 A * 7/2009 ............ B25J 9/1697
(Continued)

OTHER PUBLICATIONS

Notification of Reasons for Refusal dated Jun. 25, 2019 in Japanese Patent Application No. 2017-162670, with English translation.
(Continued)

*Primary Examiner* — Khoi H Tran
*Assistant Examiner* — Jorge O Peche
(74) *Attorney, Agent, or Firm* — Wenderoth, Lind & Ponack, L.L.P.

(57) ABSTRACT

A robot system includes a robot for performing predetermined processing to a treating object, a photographing device for photographing the treating object, a robot control device for performing position compensation of a moving destination of the robot so as to track the treating object, on a basis of previously-set information on positions of the robot, the photographing device and the treating object, and an image of the treating object photographed by the photographing device, and a display device for providing an AR space. The robot control device calculates a position of the photographing device on the basis of the information on the positions of the robot and the photographing device. The display device displays an image imitating the photographing device at a corresponding position in the AR space, on a basis of the calculated position of the photographing device.

6 Claims, 7 Drawing Sheets

(51) Int. Cl.
*B25J 19/02* (2006.01)
*B25J 13/00* (2006.01)
*G06F 3/01* (2006.01)
*G02B 27/01* (2006.01)

(52) U.S. Cl.
CPC ............ *B25J 13/00* (2013.01); *B25J 19/023* (2013.01); *G02B 27/017* (2013.01); *G06F 3/011* (2013.01)

(58) Field of Classification Search
CPC ........ B25J 9/1671; B25J 13/08; B25J 9/1605; G02B 27/017; G02B 2027/0138; G02B 2027/014; G02B 2027/0187; G06F 3/011; G05B 2219/39451
See application file for complete search history.

(56) References Cited

U.S. PATENT DOCUMENTS

| | | | | |
|---|---|---|---|---|
| 8,958,912 | B2* | 2/2015 | Blumberg | B25J 9/0087 |
| | | | | 700/259 |
| 9,227,323 | B1* | 1/2016 | Konolige | H04N 5/33 |
| 9,916,506 | B1* | 3/2018 | Davis | G06K 9/2054 |
| 10,373,336 | B1* | 8/2019 | Islam | G06T 7/73 |
| 10,388,070 | B2* | 8/2019 | Spivack | G02B 27/017 |
| 10,562,186 | B1* | 2/2020 | Islam | B25J 9/1697 |
| 2002/0136432 | A1* | 9/2002 | Koike | G06F 16/7837 |
| | | | | 382/103 |
| 2005/0065653 | A1* | 3/2005 | Ban | B25J 9/1697 |
| | | | | 700/245 |
| 2008/0013825 | A1* | 1/2008 | Nagatsuka | B25J 9/1671 |
| | | | | 382/153 |
| 2010/0004778 | A1* | 1/2010 | Arimatsu | B25J 9/1697 |
| | | | | 700/214 |
| 2012/0022924 | A1* | 1/2012 | Runnels | G06Q 30/02 |
| | | | | 705/14.4 |
| 2012/0113223 | A1* | 5/2012 | Hilliges | G06F 3/011 |
| | | | | 348/46 |
| 2012/0219179 | A1* | 8/2012 | Osako | G06T 7/20 |
| | | | | 382/103 |
| 2012/0226382 | A1* | 9/2012 | Asada | B25J 9/1605 |
| | | | | 700/259 |
| 2013/0158710 | A1* | 6/2013 | Oda | B25J 9/1669 |
| | | | | 700/259 |
| 2013/0343640 | A1* | 12/2013 | Buehler | B25J 9/1697 |
| | | | | 382/155 |
| 2015/0003678 | A1* | 1/2015 | Watanabe | B25J 9/1697 |
| | | | | 382/103 |
| 2016/0059419 | A1* | 3/2016 | Suzuki | B25J 9/1697 |
| | | | | 700/114 |
| 2016/0142621 | A1* | 5/2016 | Tomren | H04N 5/23203 |
| | | | | 348/211.8 |
| 2017/0355078 | A1* | 12/2017 | Ur | G06K 9/6202 |
| 2018/0004289 | A1* | 1/2018 | Wilson | G06F 3/013 |
| 2018/0028915 | A1* | 2/2018 | Doucet | A63F 13/26 |
| 2018/0101223 | A1* | 4/2018 | Ishihara | G06F 3/147 |
| 2018/0126553 | A1* | 5/2018 | Corkum | B25J 9/1697 |
| 2018/0272535 | A1* | 9/2018 | Ogawa | B25J 9/1692 |
| 2019/0015973 | A1* | 1/2019 | Ooba | B25J 9/0093 |
| 2019/0126487 | A1* | 5/2019 | Benaim | B25J 9/163 |
| 2019/0184582 | A1* | 6/2019 | Namiki | B25J 9/1697 |
| 2019/0389069 | A1* | 12/2019 | Kalbavi | B25J 9/0093 |
| 2020/0034621 | A1* | 1/2020 | Ooba | G05B 19/0426 |
| 2020/0074692 | A1* | 3/2020 | Ooba | G06T 7/74 |
| 2020/0078945 | A1* | 3/2020 | Sun | G06T 19/006 |
| 2020/0270788 | A1* | 8/2020 | Tanaka | D05B 19/16 |
| 2020/0302585 | A1* | 9/2020 | Takahashi | G06T 1/60 |
| 2021/0191600 | A1* | 6/2021 | Lemay | G06F 3/04883 |
| 2021/0283782 | A1* | 9/2021 | Miao | B25J 9/1697 |
| 2021/0286502 | A1* | 9/2021 | Lemay | G06F 3/013 |
| 2021/0382544 | A1* | 12/2021 | Butcher | G06F 3/011 |

FOREIGN PATENT DOCUMENTS

| | | | | | |
|---|---|---|---|---|---|
| CN | 102990678 | A | * | 3/2013 | ............ B25J 19/023 |
| CN | 104552292 | A | * | 4/2015 | ............ B23P 19/007 |
| CN | 111185901 | A | * | 5/2020 | .............. B25J 13/08 |
| CN | 113056351 | A | * | 6/2021 | ........ G06F 3/04883 |
| CN | 113103230 | A | * | 7/2021 | |
| DE | 102015217618 | A1 | * | 9/2016 | ............ B25J 9/1697 |
| DE | 102020124356 | A1 | * | 3/2021 | .............. B25J 13/08 |
| EP | 2558924 | B1 | * | 6/2021 | .......... G06F 3/0346 |
| EP | 3889737 | A1 | * | 10/2021 | ............. G06F 3/012 |
| JP | 2004-213673 | | | 7/2004 | |
| JP | 2012-171024 | | | 9/2012 | |
| JP | 2014-128845 | | | 7/2014 | |
| JP | 2014-180707 | | | 9/2014 | |
| JP | 5850962 | B2 | * | 2/2016 | ............ B25J 9/1607 |
| JP | 2016-049601 | | | 4/2016 | |
| JP | 2016-107379 | | | 6/2016 | |
| JP | 2016-209995 | | | 12/2016 | |
| JP | 2017-094406 | | | 6/2017 | |
| JP | 7145332 | B2 | * | 9/2022 | |
| TW | I566906 | B | * | 1/2017 | |
| TW | I706840 | B | * | 10/2020 | |
| WO | WO-2021191002 | A1 | * | 9/2021 | .......... G02B 27/027 |

OTHER PUBLICATIONS

Notification of Reasons for Refusal dated Aug. 20, 2019 in Japanese Patent Application No. 2017-162670, with English translation.
Notification of Reasons for Refusal dated Jun. 9, 2020 in Japanese Patent Application No. 2017-162670, with English translation.
Office Action dated Sep. 5, 2022 in Chinese Patent Application No. 201810961409.8.

* cited by examiner

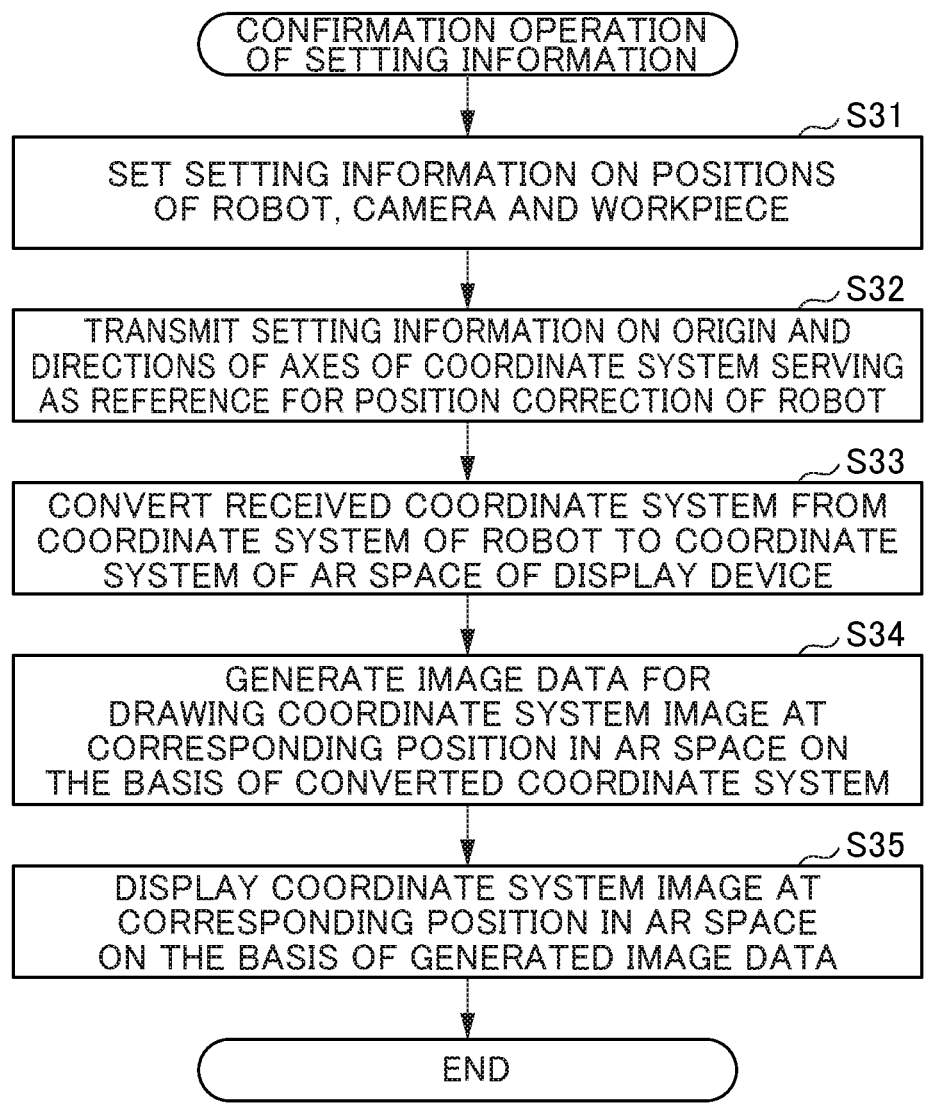

ROBOT SYSTEM

This application is based on and claims the benefit of priority from Japanese Patent Application No. 2017-162670, filed on 25 Aug. 2017, the content of which is incorporated herein by reference.

BACKGROUND OF THE INVENTION

Field of the Invention

The present invention relates to a robot system for performing position compensation of a moving destination of a robot so as to track a treating object on the basis of the image of the treating object photographed by a photographing device.

Related Art

Each of Patent Document 1 and Patent Document 2 discloses a robot system for performing position compensation of a moving destination of a robot on the basis of the image photographed by a photographing device. The robot system disclosed in Patent Document 1 generates a CG image of a robot on the basis of the image of the robot photographed by a photographing device, and displays the CG image on a touch screen. The robot system virtually moves the robot in the CG image on the touch screen in response to touch operation by a user, and moves the actual robot so as to track the motion of the virtual robot. The robot system disclosed in Patent Document 2 displays the image of a treating object photographed by a photographing device on a display device. Thus, an operator remotely operates the motion of the robot on the basis of the image of the treating object displayed on the display device.

Some industrial robot systems, as an example, each perform position compensation of a moving destination of a robot so as to track a treating object, on the basis of the image of the treating object photographed by a photographing device. In such a robot system, information on the positions of the robot, the photographing device and the treating object is set previously. The information on the positions of the robot, the photographing device and the treating object includes, for example, (i) the origin and the directions of the respective axes of a coordinate system serving as the reference for the position compensation of the robot,
(ii) the position of the robot (for example, rotational angles or translation amounts of respective joints of the robot described below) serving as the reference for the position compensation of the robot,
(iii) the relative positional relation between the robot and the photographing device, and
(iv) the distance between the photographing device and the treating object.

In a typical robot, the base part thereof is fixed on the ground, a rail or the like. Accordingly, in the present application, the term of "move, movement, moving or the like" does not means transportation of the robot itself, means that the rotational angles or translation amounts of respective joints of a robot are changed so that a position of one point of a portion targeted for position control of the robot (for example, the tip part of the arm thereof) is moved.

Patent Document 1: Japanese Unexamined Patent Application, Publication No. 2012-171024

Patent Document 2: Japanese Unexamined Patent Application, Publication No. 2004-213673

SUMMARY OF THE INVENTION

As described above, the position compensation of the moving destination of the robot requires previous setting of the information on the positions of the robot, the photographing device and the treating object. If the information is erroneously set in this case, the robot, which is expected to move to track the position of the treating object displayed in the photographed image, but may perform inappropriate behavior of not tracking the p-position of the treating object. Therefore, it is necessary to confirm whether or not the setting information on the positions of the robot, the photographing device and the treating object is appropriate.

In the robot system, the position compensation amount of the robot is calculated on the basis of the photographed image of the treating object. An operator is informed of the calculated position compensation amount of the robot. However, since the information on the position of the robot includes, for example, rotational angles or translation amounts of a plurality of joints as described above, an operator is required to have skill and attention to precisely estimate the actual position of the moving destination of the robot. For this reason, a discrepancy likely occurs between the recognition by the operator and the movement of the robot, and thus it is difficult to appropriately set the setting information on the positions of the robot, the photographing device and the treating object.

As described above, since whether or not the setting information is set appropriately is difficult to be confirmed before the robot system is operated, it may be confirmed when the robot system is operated actually. However, if the setting information is erroneously set, the robot may move to an inappropriate position, thereby causing a problem that the robot hurts an operator or breaks a peripheral device due to collision with them.

In the case where the treating object is moved by a conveyor or the like (in the case of tracking), such confirmation becomes more difficult. In an example, in the case where the confirmation is made when the robot system is operated actually, the position of the treating object may change, whereby the treating object may not exist in the view range of the photographed image. In order to avoid the above-described collision between the robot and the operator or a peripheral device, the robot may be moved slowly, and yet in such a case, the speed of the conveyor or the like needs to be slower. As described above, setting adjustment other than for the robot requires more workload, whereby it becomes more difficult to grasp the position of the moving destination of the robot after the position compensation. Furthermore, the time for confirming the setting information becomes longer.

The object of the present invention is to provide a robot system capable of accurately and easily confirming in a short time whether or not setting information on a position of a robot, a photographing device or a treating object is set appropriately.

In order to solve the problems above, the inventors of the present application have conceived an idea of visualizing setting information on a position of a robot, a photographing device or a treating object by use of an AR space. Regarding this point, although each of Patent Document 1 and Patent Document 2 discloses that the position of the robot is controlled by use of an AR space, the robot system disclosed in each of Patent Document 1 and Patent Document 2 does not confirm whether or not setting information on a position of a robot, a photographing device or a treating object is set appropriate by use of the AR space including the robot, the photographing device and the treating object.

(1) A robot system according to the present invention (for example, a robot system 1 described below) includes a robot (for example, a robot 10 described below) for performing predetermined processing to a treating object (for example, a workpiece W described below), a photographing device (for example, a camera 20 described below) for photographing the treating object, a robot control device (for example, a robot control device 40 described below) for performing position compensation of a moving destination of the robot so as to track the treating object, on a basis of previously-set information on positions of the robot, the photographing device and the treating object, and an image of the treating object photographed by the photographing device, and a display device (for example, a display device 60 described below) for providing an AR space. The robot control device calculates a position of the photographing device on the basis of the information on the positions of the robot and the photographing device. The display device displays an image imitating the photographing device at a corresponding position in the AR space, on a basis of the calculated position of the photographing device.

(2) In the robot system according to (1), the information on the position of the robot may include (i) an origin and directions of respective axes of a coordinate system serving as a reference for position compensation of the robot, and (ii) the position of the robot serving as the reference for the position compensation of the robot. The information on the position of the photographing device may include (iii) a relative positional relation between the robot and the photographing device.

(3) Another robot system according to the present invention (for example, a robot system 1 described below) includes a robot (for example, a robot 10 described below) for performing predetermined processing to a treating object (for example, a workpiece W described below), a photographing device (for example, a camera 20 described below) for photographing the treating object, a robot control device (for example, a robot control device 40 described below) for performing position compensation of a moving destination of the robot so as to track the treating object, on a basis of previously-set information on positions of the robot, the photographing device and the treating object, and an image of the treating object photographed by the photographing device, and a display device (for example, a display device 60 described below) for providing an AR space. The robot control device calculates a position of the treating object on the basis of the information on the positions of the robot, the photographing device and the treating object, and the image of the treating object photographed by the photographing device. The display device displays the image of the treating object photographed by the photographing device at a corresponding position in the AR space, on a basis of the calculated position of the treating object.

(4) In the robot system according to (3), the information on the position of the robot may include (i) an origin and directions of respective axes of a coordinate system serving as a reference for position compensation of the robot, and (ii) the position of the robot serving as the reference for the position compensation of the robot. The information on the position of the photographing device may include (iii) a relative positional relation between the robot and the photographing device. The information on the position of the treating object may include (iv) a distance between the photographing device and the treating object.

(5) In the robot system according to (3) or (4), the treating object may move on a conveyor, and thus the robot control device may calculate the position of the treating object further on the basis of a moving speed of the treating object.

(6) Another robot system according to the present invention (for example, a robot system 1 described below) includes a robot (for example, a robot 10 described below) for performing predetermined processing to a treating object (for example, a workpiece W described below), a photographing device (for example, a camera 20 described below) for photographing the treating object, a robot control device (for example, a robot control device 40 described below) for performing position compensation of a moving destination of the robot so as to track the treating object, on a basis of previously-set information on positions of the robot, the photographing device and the treating object, and an image of the treating object photographed by the photographing device, and a display device (for example, a display device 60 described below) for providing an AR space. The information on the position of the robot includes an origin and directions of respective axes of a coordinate system serving as a reference for position compensation of the robot. The display device displays an image imitating the origin and the directions of the respective axes of the coordinate system serving as the reference for the position compensation of the robot.

The present invention enables to provide a robot system capable of accurately and easily confirming in a short time whether or not setting information on a position of a robot, a photographing device or a treating object is set appropriately.

BRIEF DESCRIPTION OF THE DRAWINGS

FIG. 7 is a flowchart indicating the confirmation operation of setting information performed by the robot system according to the third embodiment.

DETAILED DESCRIPTION OF THE INVENTION

Figure 1:
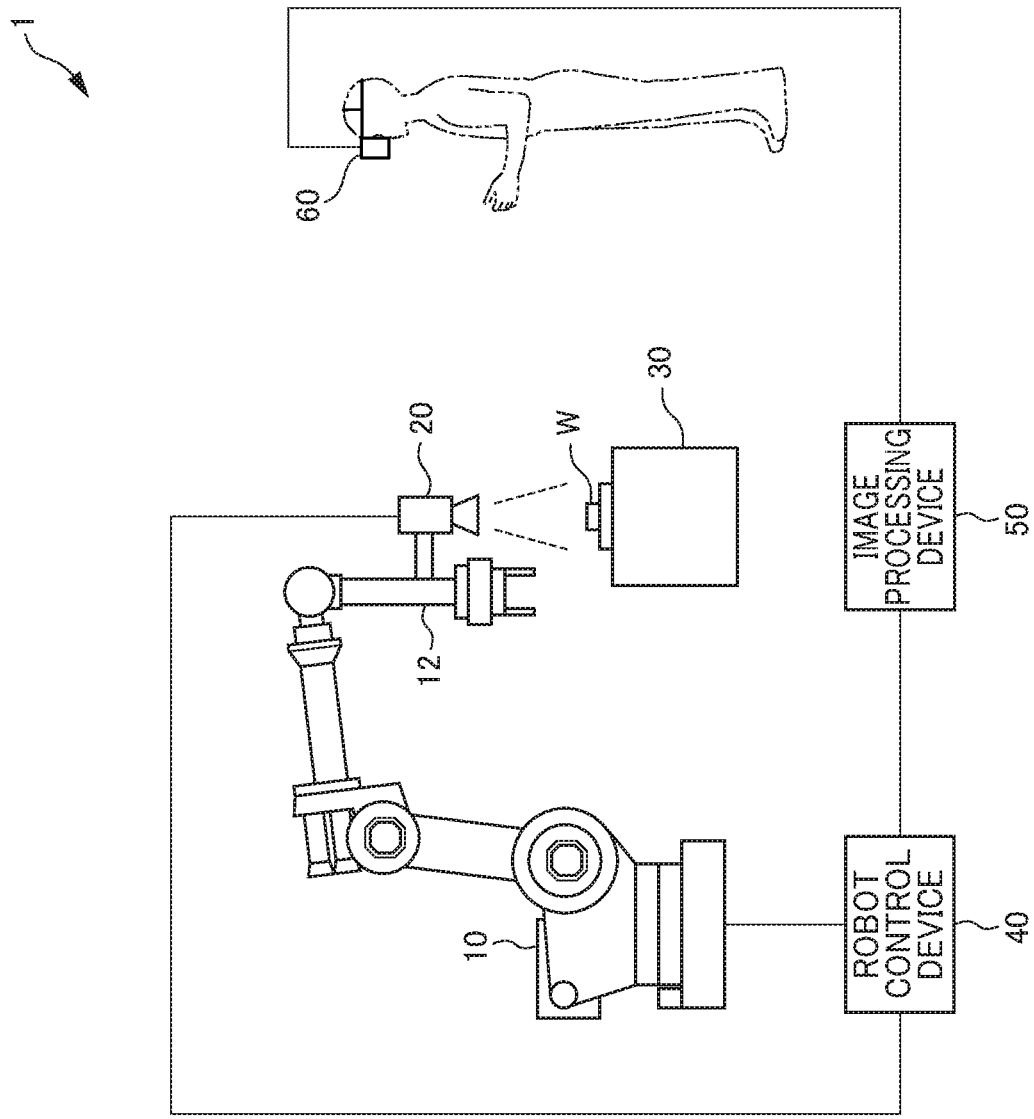
FIG. 1 is a diagram illustrating a configuration of a robot system according to the present embodiment.

Some exemplary embodiments of the present invention will be described below with reference to the accompanying drawings. It is noted that the same reference numerals are assigned to the same or corresponding parts in respective drawings.

First Embodiment

FIG. 1 is a diagram illustrating a configuration of a robot system according to a first embodiment. A robot system 1 shown in FIG. 1 performs, on the basis of an image of a workpiece (treating object) W photographed by a camera (photographing device) 20, position compensation of the moving destination of the tip part (portion targeted for position control) of an arm 12 of a robot 10 so as to track the workpiece W. The robot system 1 includes the robot 10, the camera 20, a conveyor 30, a robot control device 40, an image processing device 50, and an AR display device 60.

The robot 10 is a robot for performing predetermined processing such as inspection of the workpiece W and/or machining of the workpiece W. A well-known robot manipulator is available as the robot 10. FIG. 1 shows an example of a manipulator having six joint axes as the robot 10. In this robot 10, the tip part of the arm 12 is the portion targeted for position control.

The camera 20 is provided to the tip part of the arm 12 of the robot 10. The camera 20 photographs the workpiece W, and provides the robot control device 40 with the photographed image of the workpiece W.

The workpiece W is set on the conveyor 30. The conveyor 30 moves the workpiece W at a predetermined speed in a predetermined conveying direction.

In the robot control device 40, setting information on the positions of the robot 10, the camera 20 and the workpiece W is set previously. The robot control device 40 obtains from the camera 20 the image of the workpiece W photographed by the camera 20. The robot control device 40 obtains an operation command (operation program) from, for example, a numerical control device (not shown). The robot control device 40 performs position control of the tip part (portion targeted for position control) of the arm 12 of the robot 10 and position compensation of the moving destination thereof so as to track the workpiece W, on the basis of the operation command, the setting information on the positions of the robot 10, the camera 20 and the workpiece W, and the image of the workpiece W.

The setting information on the position of the robot 10 includes, for example,
(i) the origin and the directions of the respective coordinate axes of a three-dimensional coordinate system serving as the reference for the position compensation of the robot 10, and
(ii) the position of the robot 10 (for example, rotational angles or translation amounts of respective joints) serving as the reference for the position compensation of the robot 10.

The setting information on the position of the camera 20 includes, for example,
(iii) the relative positional relation between the robot 10 and the camera 20.

The setting information on the position of the workpiece W includes, for example,
(iv) the distance between the camera 20 and the workpiece W.

The robot control device 40 calculates the position of the camera 20 on the basis of the setting information (i), (ii) and (iii) on the positions of the robot 10 and the camera 20, in order to confirm whether or not the setting information on the positions of the robot 10 and the camera 20 in the setting information is set appropriately.

The image processing device 50 generates image data for drawing a camera image imitating the camera 20 at a corresponding position in an AR space provided by the display device 60, on the basis of the calculated position of the camera 20. The image processing device 50 may be included in the robot control device 40.

Figure 2:
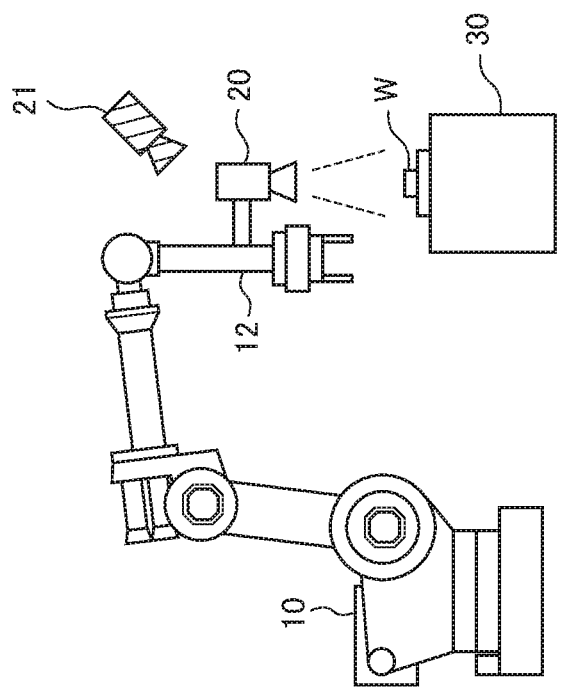
FIG. 2 is a diagram illustrating one example of an AR space displayed on a display device in the robot system shown in FIG. 1 according to a first embodiment.

The display device 60 provides the AR (Augmented Reality) space in which virtual information is superimposed and displayed on a real space. A head mounted display may serve as one example of the display device 60. FIG. 2 shows one example of the AR space displayed on the display device 60. As shown in FIG. 2, the display device 60 displays a camera image 21 at a corresponding position in the AR space including the robot 10, the camera 20 and the workpiece W, on the basis of the image data generated by the image processing device 50.

Each of the robot control device 40 and the image processing device 50 described above is configured with an arithmetic processor, for example, DSP (Digital Signal Processor) or FPGA (Field-Programmable Gate Array). The various functions of the robot control device 40 and the image processing device 50 are realized by, for example, executing predetermined software (a program, application) stored in a storage part. The various functions of the robot control device 40 and the image processing device 50 may be realized by cooperation of hardware and software, or may be realized by hardware (electronic circuit) alone.

The robot control device 40, which is connected to the robot 10, the camera 20 and the image processing device 50 in a wired or wireless manner, is capable of transmitting information thereto and receiving information therefrom. The image processing device 50, which is connected to the display device 60 in a wired or wireless manner, is capable of transmitting information thereto and receiving information therefrom.

Figure 3:
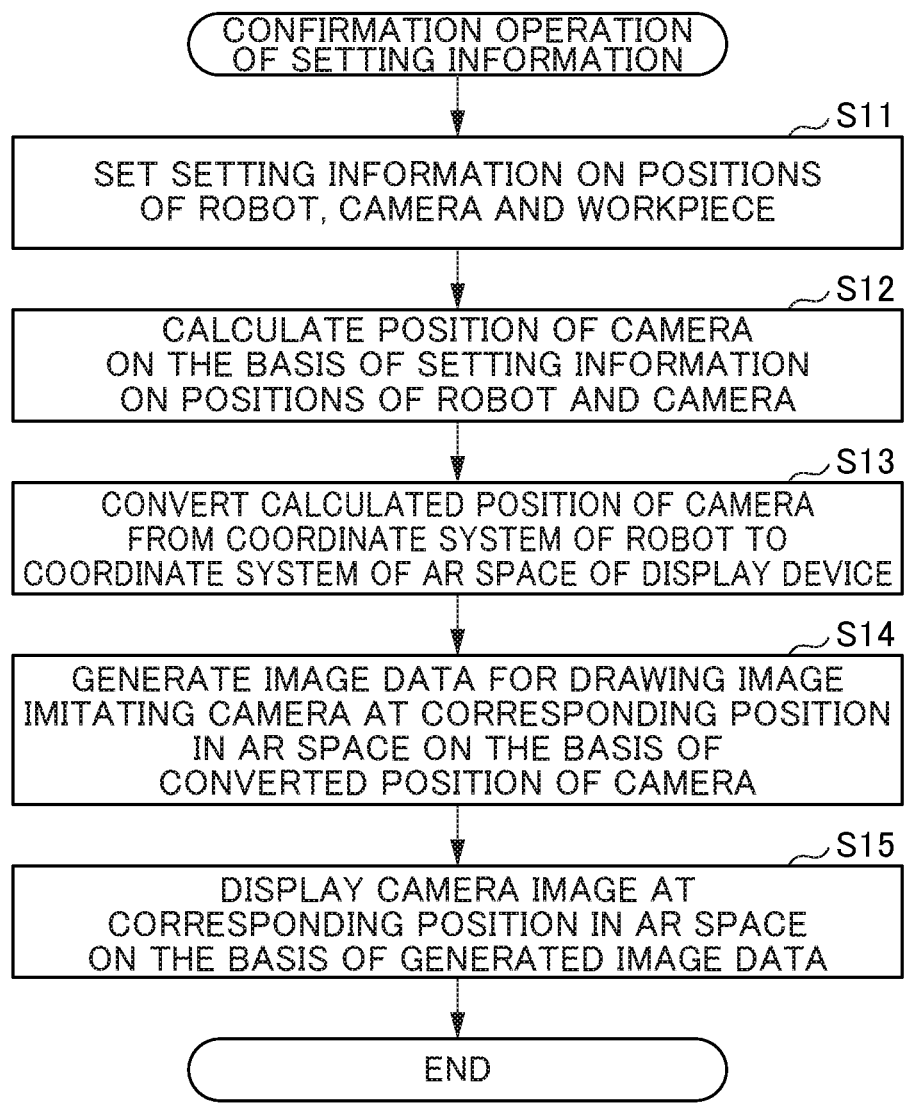
FIG. 3 is a flowchart indicating the confirmation operation of setting information performed by the robot system according to the first embodiment.

The description with reference to FIG. 3 is given below, of the confirmation operation of the setting information performed by the robot system 1 according to the first embodiment. FIG. 3 is a flowchart indicating the confirmation operation of the setting information performed by the robot system 1 according to the first embodiment.

Firstly, an operator sets the camera 20 at the tip part (the portion targeted for position control) of the arm 12 of the robot 30.

Subsequently, the operator registers the setting information on the positions of the robot 10, the camera 20 and the workpiece W in the robot control device 40. In such a manner, the setting information on the positions of the robot 10, the camera 20 and the workpiece W is previously set in the robot control device 40 (S11). As described above, the setting information on the positions of the robot 10, the camera 20 and the workpiece W includes
(i) the origin and the directions of the respective coordinate axes of a three-dimensional coordinate system serving as the reference for the position compensation of the robot 10,
(ii) the position of the robot 10 (for example, rotational angles or translation amounts of respective joints) serving as the reference for the position compensation of the robot 10,
(iii) the relative positional relation between the robot 10 and the camera 20, and
(iv) the distance between the camera 20 and the workpiece W.

The present embodiment indicates one example in which an operator directly registers the setting information in the robot control device 40. Alternatively, the robot control device 40 may obtain the positions of the robot 10, the camera 20 and the workpiece W by calculation. In an example, the robot control device 40 may photograph the marks attached to the robot 10, the camera 20 and the workpiece W by use of the camera whose position has been obtained in advance, and may calculate the positions of the robot 10, the camera 20 and the workpiece W on the basis of the photographed images.

Subsequently, the robot control device 40 calculates the position of the camera 20 on the basis of the setting information (i), (ii), (iii) on the positions of the robot 10 and the camera 20 (S12).

Subsequently, the image processing device 50 converts the calculated position of the camera 20 from the coordinate system of the robot 10 to the coordinate system of the AR space provided by the display device 60 (S13). Subsequently, the image processing device 50 generates image data for drawing the camera image 21 imitating the camera 20 at a corresponding position in the AR space provided by the display device 60, on the basis of the converted position of the camera 20 (S14). Subsequently, as shown in FIG. 2, the display device 60 displays the camera image 21 at a corresponding position in the AR space including the robot 10, the camera 20 and the workpiece W, on the basis of the generated image data (S15).

Therefore, the operator wearing the display device 60 is able to confirm whether or not the setting information is set appropriately, on the basis of the position of the camera image 21 in the AR space with respect to the position of the actual camera 20. In an example, in the case where the camera image 21 overlaps with the actual camera 20, the setting information is set appropriately. While in the case where the camera image 21 is displaced from the actual camera 20, the setting information may be erroneous. In this case, the setting information on the positions of the robot 10 and the camera 20 is reset, and the above-described confirmation operation of the setting information is performed again. It is noted that the case where the camera image 21 is displaced from the actual camera 20 may be caused due to improper setting of the camera 20, for example, due to the camera 20 not firmly fixed or due to a loose lens. In this case, the camera 20 is reset appropriately, and the above-described confirmation operation of the setting information is performed again.

As described above, in the robot system 1 according to the first embodiment, the robot control device 40 calculates the position of the camera 20 on the basis of the setting information on the positions of the robot 10 and the camera 20, while the display device 60 displays the camera image 21 imitating the camera 20 at a corresponding position in the AR space, on the basis of the calculated position of the camera 20. This visualizes the setting information on the positions of the robot 10 and the camera 20, whereby whether or not the setting information is appropriately set is enabled to be accurately and easily confirmed in a short time.

Second Embodiment

Figure 4:
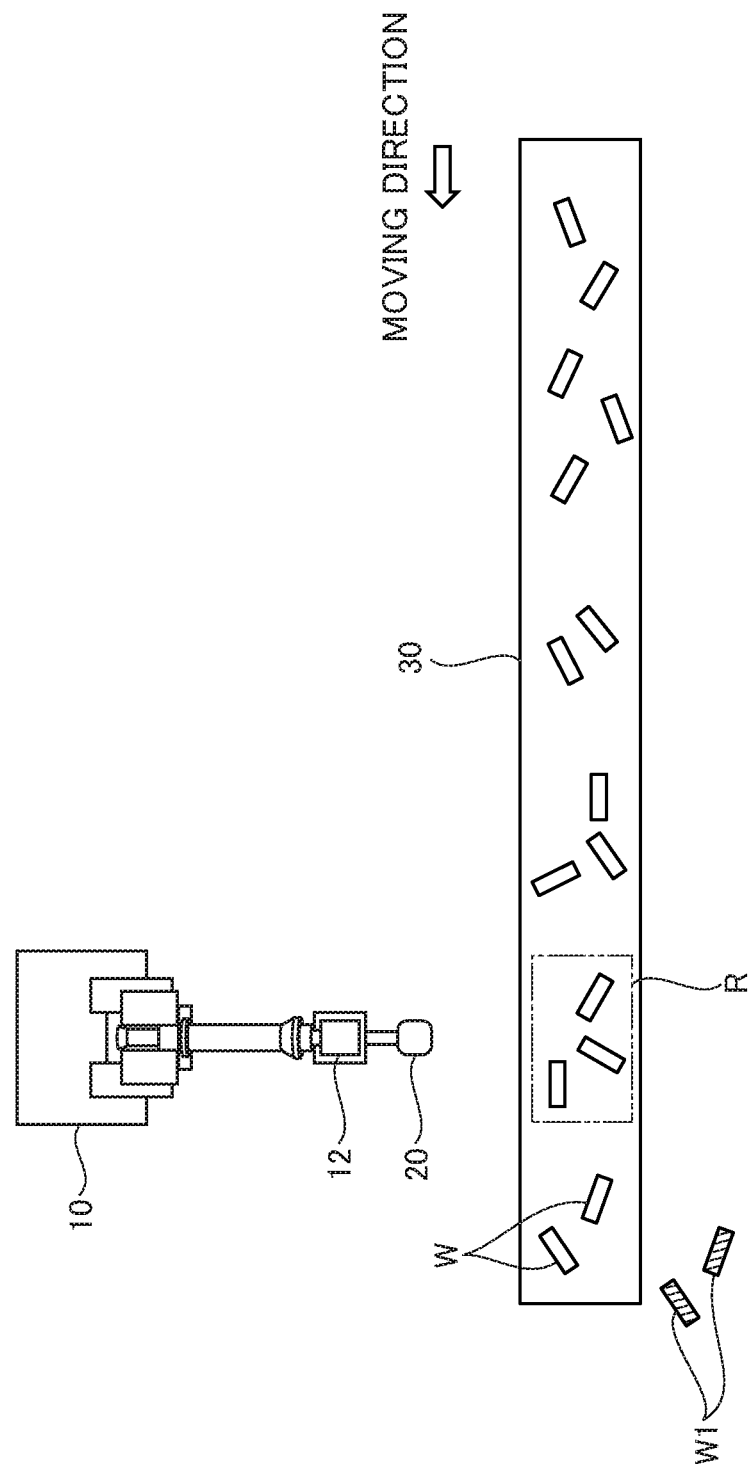
FIG. 4 is a diagram illustrating one example of an AR space displayed on a display device in the robot system shown in FIG. 1 according to a second embodiment.

In the first embodiment, as shown in FIG. 2, the camera image 21 based on the setting information is displayed in the AR space, whereby whether or not the setting information on the positions of the robot 10 and the camera 20 is appropriately set is confirmed. In the second embodiment, as shown in FIG. 4, a workpiece image W1 based on the setting information is displayed in the AR space, whereby whether or not the setting information on the positions of the robot 10, the camera 20 and the workpiece W is appropriately set is confirmed.

The configuration of the robot system 1 according to the second embodiment is the same as the configuration of the robot system 1 according to the first embodiment shown in FIG. 1. It is noted that the robot system 1 according to the second embodiment is different in the functions and the operation of the robot control device 40, the image processing device 50 and the display device 60, from the robot system 1 according to the first embodiment.

The robot control device 40 calculates the position of the workpiece W, on the basis of the setting information (i), (ii), (iii), (iv) on the positions of the robot 10, the camera 20 and the workpiece W, and the image of the workpiece W photographed by the camera 20, in order to confirm whether or not the setting information on the positions of the robot 10, the camera 20 and the workpiece W is set appropriately.

The image processing device 50 generates image data for drawing the image of the workpiece W photographed by the camera 20 at a corresponding position in the AR space provided by the display device 60, on the basis of the calculated position of the workpiece W.

FIG. 4 shows one example of the AR space displayed on the display device 60. As shown in FIG. 4, the display device 60 displays the workpiece image W1 at a corresponding position in the AR space including the robot 10, the camera 20 and the workpiece W, on the basis of the image data generated by the image processing device 50.

Figure 5:
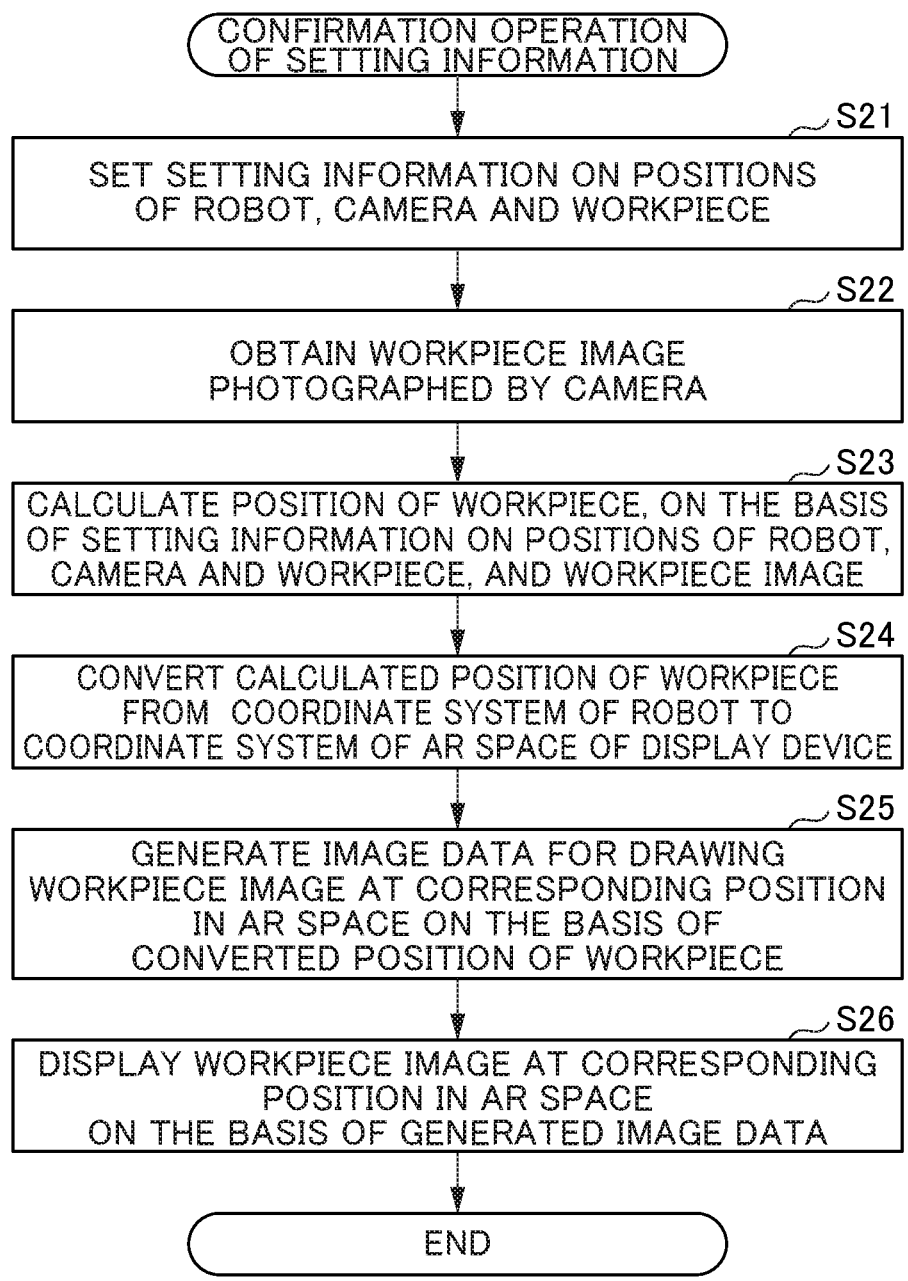
FIG. 5 is a flowchart indicating the confirmation operation of setting information performed by the robot system according to the second embodiment.

The description with reference to FIG. 5 is given below, of the confirmation operation of the setting information performed by the robot system 1 according to the second embodiment. FIG. 5 is a flowchart indicating the confirmation operation of the setting information performed by the robot system 1 according to the second embodiment.

Firstly, an operator sets the camera 20 at the tip part (the portion targeted for position control) of the arm 12 of the robot 10.

Subsequently, the operator registers the setting information on the positions of the robot 10, the camera 20 and the workpiece W in the robot control device 40. In such a manner, the setting information on the positions of the robot 10, the camera 20 and the workpiece W is previously set in the robot control device 40 (S21). As described above, the setting information on the positions of the robot 10, the camera 20 and the workpiece W includes (i) the origin and the directions of the respective coordinate axes of a three-dimensional coordinate system serving as the reference for the position compensation of the robot 10, (ii) the position of the robot 10 (for example, rotational angles or translation amounts of respective joints) serving as the reference for the position compensation of the robot 10, (iii) the relative positional relation between the robot 10 and the camera 20, and (iv) the distance between the camera 20 and the workpiece W.

Subsequently, the robot control device 40 obtains the image of the workpiece W photographed by the camera 20 (S22).

Subsequently, the robot control device 40 calculates the position of the workpiece W, on the basis of the setting information (i), (ii), (iii), (iv) on the positions of the robot 10, the camera 20 and the workpiece W, and the obtained image of the workpiece W (S23).

Subsequently, the image processing device 50 converts the calculated position of the workpiece W from the coordinate system of the robot 10 to the coordinate system of the AR space provided by the display device 60 (S24). Subsequently, the image processing device 50 generates image data for drawing the obtained workpiece image W1 at a corresponding position in the AR space provided by the display device 60, on the basis of the converted position of the workpiece W (S25). Subsequently, as shown in FIG. 4, the display device 60 displays the workpiece image W1 at a corresponding position in the AR space including the robot 10, the camera 20 and the workpiece W, on the basis of the generated image data (S26).

In the case of tracking, the workpiece W is moved by the conveyor 30. Therefore, in step S23, the robot control device 40 calculates the position of the workpiece W on the basis of the moving speed of the workpiece W by the conveyor 30. The moving speed of the workpiece W by the conveyor 30 may be set previously or may be detected by use of a speed sensor or the like. This enables, in step S26, the display device 60 to display the workpiece image W1 as shown in FIG. 4 so as to track the workpiece W moved from a photographing range R of the camera 20.

Accordingly, the operator wearing the display device 60 is able to confirm whether or not the setting information is set appropriately, on the basis of the position of the workpiece image W1 in the AR space with respect to the position of the actual workpiece W. In an example, in the case where the workpiece image W1 overlaps with the actual workpiece W, the setting information is set appropriately. While in the case where the workpiece image W1 is displaced from the actual workpiece W, the setting information may be erroneous. In this case, the setting information on the positions of the robot 10, the camera 20 and the workpiece W is reset, and the above-described confirmation operation of the setting information is performed again. It is noted that the case where the workpiece image W1 is displaced from the actual workpiece W may be caused due to improper setting of the camera 20, for example, due to the camera 20 not firmly fixed or due to a loose lens. In this case, the camera 20 is reset appropriately, and the above-described confirmation operation of the setting information is performed again.

As described above, in the robot system 1 according to the second embodiment, the robot control device 40 calculates the position of the workpiece W, on the basis of the information on the positions of the robot 10, the camera 20 and the workpiece W, and the image of the workpiece W photographed by the camera 20, while the display device 60 displays the workpiece image W1 photographed by the camera 20 at a corresponding position in the AR space, on the basis of the calculated position of the workpiece W. This visualizes the setting information on the positions of the robot 10, the camera 20 and the workpiece W, whereby whether or not the setting information is appropriately set is enabled to be accurately and easily confirmed in a short time.

Moreover, in the robot system 1 according to the second embodiment, even in the case of tracking in which the workpiece W is moved by the conveyor 30, the robot control device 40 calculates the position of the workpiece W on the basis of the moving speed of the workpiece W by the conveyor 30. This enables the display device 60 to display the workpiece image W1 as shown in FIG. 4, so as to track the workpiece W moved from the photographing range R of the camera 20.

Third Embodiment

Figure 6:
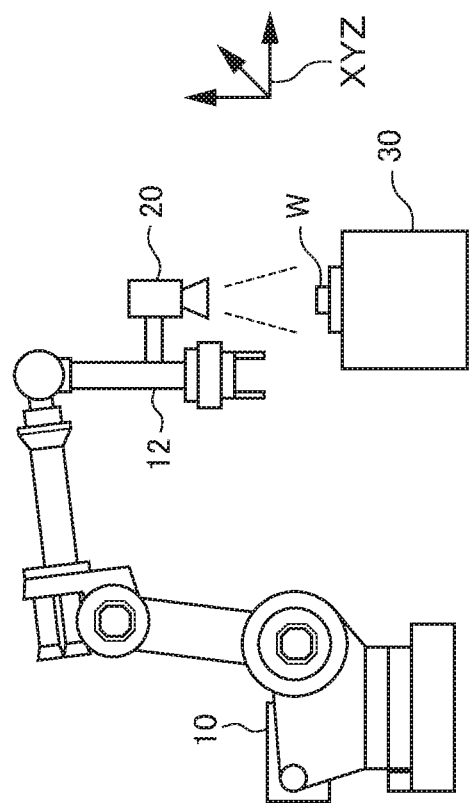
FIG. 6 is a diagram illustrating one example of an AR space displayed or a display device in the robot system shown in FIG. 1 according to a third embodiment.

In the third embodiment, as shown in FIG. 6, a coordinate system image XYZ based on the setting information is displayed in the AR space, whereby the setting information (i) on the origin and the directions of the respective coordinate axes of a three-dimensional coordinate system serving as the reference for the position compensation of the robot 10 is confirmed.

The configuration of the robot system 1 according to the third embodiment is the same as the configuration of the robot system 1 according to the first embodiment shown in FIG. 1. It is noted that the robot system 1 according to the third embodiment is different in the functions and the operation of the robot control device 40, the image processing device 50 and the display device 60, from the robot system 1 according to the first embodiment.

The robot control device 40 transmits to the image processing device 50 the setting information (i) on the origin and the directions of the respective coordinate axes of a three-dimensional coordinate system serving as the reference for the position compensation of the robot 10 included in the setting information, for confirmation as to whether the setting information (i) is set appropriately.

The image processing device 50 generates image data for drawing the coordinate system image at a corresponding position in the AR space provided by the display device 60, on the basis of the received setting information (i).

FIG. 6 shows one example of the AR space displayed on the display device 60. As shown in FIG. 6, the display device 60 displays the coordinate system image XYZ at a corresponding position in the AR space including the robot 10, the camera 20 and the workpiece W, on the basis of the image data generated by the image processing device 50.

The description with reference to FIG. 7 is given below, of the confirmation operation of the setting information performed by the robot system 1 according to the third embodiment. FIG. 1 is a flowchart indicating the confirmation operation of the setting information performed by the robot system 1 according to the third embodiment.

Firstly, an operator sets the camera 20 at the tip part (the portion targeted for position control) of the arm 12 of the robot 10.

Subsequently, the operator registers the setting information on the positions of the robot 10, the camera 20 and the workpiece W in the robot control device 40. In such a manner, the setting information on the positions of the robot 10, the camera 20 and the workpiece W is previously set in the robot control device 40 (S31). As described above, the setting information on the positions of the robot 10, the camera 20 and the workpiece W includes (i) the origin and the directions of the respective coordinate axes of a three-dimensional coordinate system serving as the reference for the position compensation of the robot 10, (ii) the position of the robot 10 (for example, rotational angles or translation amounts of respective joints) serving as the reference for the position compensation of the robot 10, (iii) the relative positional relation between the robot 10 and the camera 20, and (iv) the distance between the camera 20 and the workpiece W.

Subsequently, the robot control device 40 transmits the setting information (i) to the image processing device 50 (S32). Subsequently, the image processing device 50 converts the origin and the directions of the three coordinate axes of a three-dimensional coordinate system serving as the reference for the position compensation of the robot 10, from the coordinate system of the robot 10 to the coordinate system of the AR space provided by the display device 60 (S33). Subsequently, the image processing device 50 generates image data for drawing the coordinate system image XYZ at a corresponding position in the AR space provided by the display device 60, on the basis of the converted coordinate system (S34). Subsequently, as shown in FIG. 6, the display device 60 displays the coordinate system image XYZ at a corresponding position in the AR space including the robot 10, the camera 20 and the workpiece W, on the basis of the generated image data (S35).

As described above, in the robot system 1 according to the third embodiment, the display device 60 displays, at a corresponding position in the AR space, the coordinate system image XYZ of the coordinate system imitating (i) the origin and the directions of the respective axes of a three-dimensional coordinate system serving as the reference for the position compensation of the robot 10. This visualizes the setting information (i) on the origin and the directions of the respective axes of a three-dimensional coordinate system serving as the reference for the position compensation of the robot 10, whereby whether or not the setting information (i) is appropriately set is enabled to be accurately and easily confirmed in a short time. In addition, an operator is able to confirm at a glance whether or not the setting for the coordinate system is consistent with the recognition by the operator.

Although some embodiments of the present invention have been described above, the present invention is not limited to the above-described embodiments. The effects described in the present embodiments are listed merely as the most preferable effects produced by the present invention. The effects produced by the present invention are not limited to those described in the present embodiments.

In an example, although the camera 20 is set to the tip part of the arm 12 of the robot 10 in the embodiments described above, the present invention is not limited thereto. The features of the present invention are also applicable to an embodiment in which the camera 20 is fixed and set on a stand or the like disposed independently from the robot 10.

Although a camera serves as the photographing device 20 in the above-described embodiments, the present invention is not limited thereto. Various photographing devices capable of photographing a workpiece image such as a visual sensor may be used as the photographing device 20.

Although a head mounted display serves as the display device 60 in the above-described embodiments, the present invention is not limited thereto. Various display devices capable of providing an AR space may be used as the display device 60.

Although an industrial robot system serves as the robot system 1 in the above-described embodiments, the present invention is not limited thereto. The features of the present invention are applicable to confirmation of setting information in various robot systems each in which it is difficult to confirm whether or not the setting information is appropriate.

EXPLANATION OF REFERENCE NUMERALS

1 ROBOT SYSTEM
10 ROBOT
12 ARM
20 CAMERA (PHOTOGRAPHING DEVICE)
21 CAMERA IMAGE (IMAGE IMITATING PHOTOGRAPHING DEVICE)
30 CONVEYOR
40 ROBOT CONTROL DEVICE
50 IMAGE PROCESSING DEVICE
60 DISPLAY DEVICE
W WORKPIECE (TREATING OBJECT)
W1 WORKPIECE IMAGE (IMAGE OF TREATING OBJECT)
XYZ COORDINATE SYSTEM IMAGE (IMAGE IMITATING COORDINATE SYSTEM)

What is claimed is:

1. A method comprising:
performing position compensation of a moving destination of a robot so as to track a workpiece, the robot being for performing predetermined processing on the workpiece, the position compensation being performed based on (i) previously-set information on a position of the robot, (ii) previously-set information on a relative positional relationship between the robot and the photographing device, (iii) previously-set information on a position of the workpiece, and (iv) an image of the workpiece photographed by a photographing device for photographing the workpiece; and
providing, to a display device, an Augmented Reality (AR) space in which the image of the workpiece photographed by the photographing device is displayed so as to be superimposed on an image of a real space which includes the workpiece,
wherein the performing the position compensation of the moving destination of the robot includes calculating a position of the workpiece, based on the previously-set information on the position of the robot, the previously-set information on the relative positional relationship between the robot and photographing device, the previously-set information on the position of the workpiece, and the image of the workpiece photographed by the photographing device,
wherein the image of the workpiece photographed by the photographing device is superimposed on the image of the real space at a corresponding position in the AR space based on the calculated position of the workpiece, and
wherein the method further comprises determining whether or not any one of the previously-set information on the position of the robot, the previously-set information on the relative positional relationship between the robot and the photographing device, and the previously-set information on the position of the workpiece is correct based on an amount of deviation of the calculated position of the workpiece relative to the image of the workpiece photographed by the photographing device which is displayed, by the display device, so as to be superimposed on the image of the real space.

2. The method according to claim 1, wherein the previously-set information on the position of the robot includes (i) an origin and directions of respective axes of a coordinate system serving as a reference for position compensation of the robot, and (ii) the position of the robot serving as the reference for the position compensation of the robot, and
wherein the previously-set information on the position of the treating object includes a distance between the photographing device and the treating object.

3. The method according to claim 1, wherein the treating object moves on a conveyor, and
wherein the method further comprises calculating the position of the treating object based on a moving speed of the treating object.

4. A robot system comprising:
a robot for performing predetermined processing on a workpiece;
a photographing device for photographing the workpiece;

a robot control device for performing position compensation of a moving destination of the robot so as to track the workpiece, the position compensation being performed based on (i) previously-set information on a position of the robot, (ii) previously-set information on a relative positional relationship between the robot and the photographing device, (iii) previously-set information on a position of the workpiece, and (iv) an image of the workpiece photographed by the photographing device; and a display device for providing an Augmented Reality (AR) space in which the image of the workpiece photographed by the photographing device is displayed so as to be superimposed on an image of a real space which includes the workpiece, wherein the robot control device calculates a position of the workpiece, based on the previously-set information on the position of the robot, the previously-set information on the relative positional relationship between the robot and photographing device, the previously-set information on the position of the workpiece, and the image of the workpiece photographed by the photographing device, the display device superimposes the image of the workpiece photographed by the photographing device on the image of the real space at a corresponding position in the AR space based on the calculated position of the workpiece, and wherein the robot control device determines whether or not any one of the previously-set information on the position of the robot, the previously-set information on the relative positional relationship between the robot and the photographing device, and the previously-set information on the position of the workpiece is correct based on an amount of deviation of the calculated position of the workpiece relative to the image of the workpiece photographed by the photographing device which is displayed, by the display device, so as to be superimposed on the image of the real space.

5. The robot system according to claim 4, wherein the previously-set information on the position of the robot includes (i) an origin and directions of respective axes of a coordinate system serving as a reference for position compensation of the robot, and (ii) the position of the robot serving as the reference for the position compensation of the robot, and wherein the previously-set information on the position of the treating object includes a distance between the photographing device and the treating object.

6. The robot system according to claim 4, wherein the treating object moves on a conveyor, and wherein the robot control device calculates the position of the treating object based on a moving speed of the treating object.

* * * * *